United States Patent
Li et al.

(10) Patent No.: US 11,119,625 B1
(45) Date of Patent: Sep. 14, 2021

(54) REMOTE CONTROL DEVICE FOR MANUFACTURING EQUIPMENT AND METHOD FOR DETECTING MANUAL CONTROL

(71) Applicant: UNITED MICROELECTRONICS CORP., Hsinchu (TW)

(72) Inventors: Zheng-Yang Li, Kaohsiung (TW); Chung-Jung Chen, Hsinchu (TW); Chun-Man Li, Tainan (TW); Li-Hsin Yang, Tainan (TW); Ching-Pei Lin, Hsinchu County (TW); Ji-Fu Kung, Taichung (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/099,872

(22) Filed: Nov. 17, 2020

(51) Int. Cl.
*G06F 3/0481* (2013.01)
*G06F 3/0484* (2013.01)

(52) U.S. Cl.
CPC ........ *G06F 3/04812* (2013.01); *G06F 3/0484* (2013.01); *G06F 3/04815* (2013.01)

(58) Field of Classification Search
CPC . G06F 3/04812; G06F 3/04815; G06F 3/0484
See application file for complete search history.

(56) References Cited

U.S. PATENT DOCUMENTS

| | | | |
|---|---|---|---|
| 8,158,016 B2 | 4/2012 | Hayes et al. | |
| 10,570,507 B2 | 2/2020 | Shen et al. | |
| 2014/0181898 A1* | 6/2014 | Apparao | H04L 29/0685 726/1 |
| 2018/0095588 A1* | 4/2018 | Klein | G06F 1/1647 |

* cited by examiner

*Primary Examiner* — Andrey Belousov
(74) *Attorney, Agent, or Firm* — WPAT, PC

(57) ABSTRACT

A remote control device for a manufacturing equipment and a method for detecting manual control are provided. The method for detecting the manual control on the manufacturing equipment includes the following steps. A cursor pattern is created. When the user interface is automatically controlled, a history location of the cursor pattern shown on a user interface of the manufacturing equipment is detected to obtain a location distribution. The location distribution is stored. A current location of the cursor pattern shown on the user interface is detected. If the current location is not within the location distribution, it is deemed that the user interface is manually controlled.

18 Claims, 6 Drawing Sheets

REMOTE CONTROL DEVICE FOR MANUFACTURING EQUIPMENT AND METHOD FOR DETECTING MANUAL CONTROL

TECHNICAL FIELD

The disclosure relates in general to a remote control device and an operation method, and more particularly to a remote control device for a manufacturing equipment and a method for detecting manual control.

BACKGROUND

With the development of technologies, various novel and innovative products are constantly launched to the market, and the manufacturing equipment is also getting increasingly complex. A manufacturing equipment usually has a user interface for displaying various control keys or messages. The user interface of the manufacturing equipment can be automatically controlled by a Robotic Process Automation (RPA) system for reducing the manpower and increasing the efficiency.

However, in some special cases, the user interface of the manufacturing equipment must be manually controlled by an operator. The automatic control on the user interface and the manual control on the user interface are prone to conflict. Thus, there is a need to detect the manual control on the user interface, when the user interface is automatically controlled, for prevent the conflict between the automatic control and the manual control.

SUMMARY

The disclosure is directed to a remote control device for a manufacturing equipment and a method for detecting manual control. A user interface of the manufacturing equipment is detected, such that the manual control of the user interface can be detected and the user interface can be switched from an automatic control state to a manual control state. During the manual control state, the automatic control on the user interface is disabled until the user interface is switched to the automatic control state. Therefore, the conflict between the automatic control and the manual control can be prevented.

According to one embodiment, a method for detecting manual control on a manufacturing equipment is provided. The method for detecting the manual control on the manufacturing equipment includes the following steps. A cursor pattern is created. When the user interface is automatically controlled, a history location of the cursor pattern shown on a user interface of the manufacturing equipment is detected to obtain a location distribution. The location distribution is stored. A current location of the cursor pattern shown on the user interface is detected. If the current location is not within the location distribution, it is deemed that the user interface is manually controlled.

According to another embodiment, a remote control device for a manufacturing equipment is provided. The remote control device includes a communication unit, a processing unit and a storing unit. The communication unit is configured to receive frames of a user interface of the manufacturing equipment. The processing unit includes a pattern creating unit, a detecting unit and a determining unit. The pattern creating unit is configured to create a cursor pattern. The detecting unit is configured to detect a history location of the cursor pattern shown on a user interface of the manufacturing equipment, when the user interface is automatically controlled, to obtain a location distribution. The detecting unit is further configured to detect a current location of the cursor pattern shown on the user interface. The determining unit is further configured to deem that the user interface is manually controlled if the current location is not within the location distribution. The storing unit is configured to store the location distribution.

Figure 1:
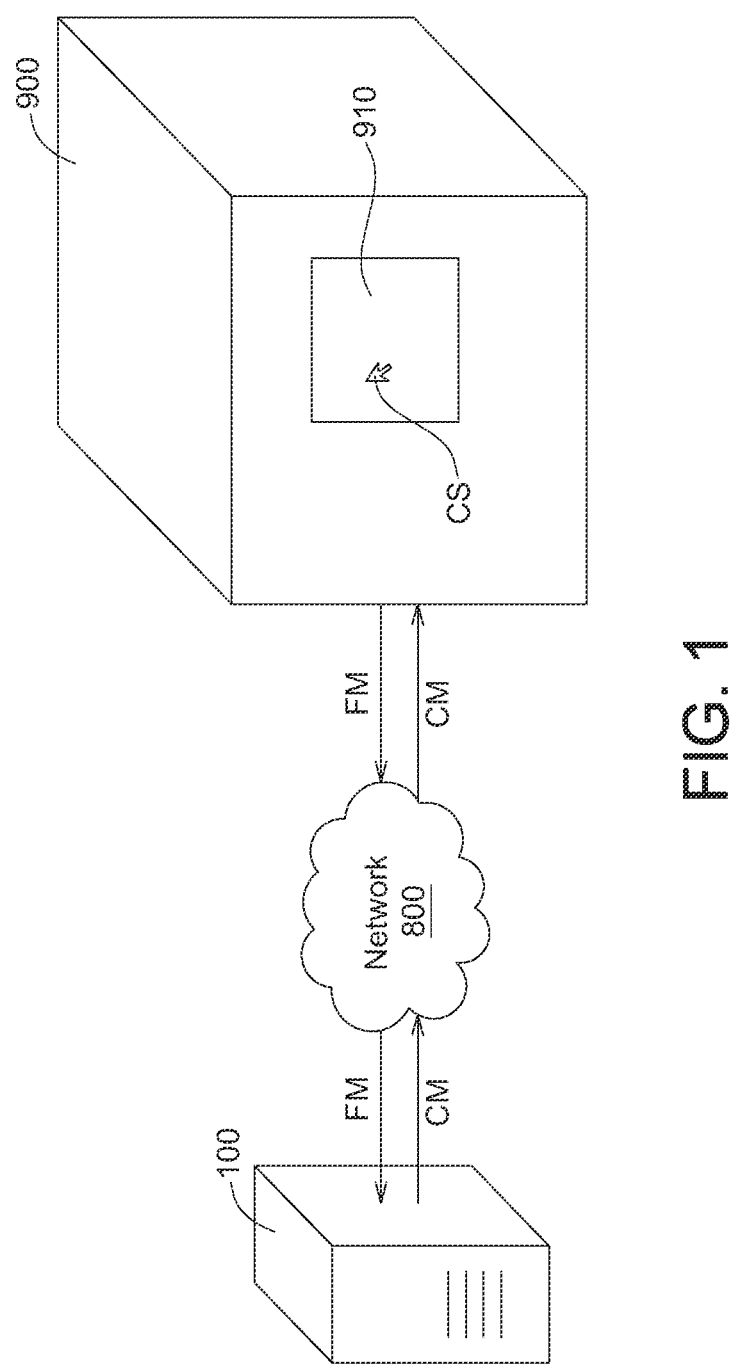
FIG. 1 shows a remote control device and a manufacturing equipment according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please referring to FIG. 1, a remote control device 100 and a manufacturing equipment 900 according to one embodiment are shown. For example, the manufacturing equipment 900 is a high current ion implantation equipment, a deposition equipment or an etching equipment. The remote control device 100 is remotely connected to the manufacturing equipment 900 via the network 800. The manufacturing equipment 900 has a user interface 910, which is used to show various control keys or messages. By clicking the control keys, the parameters of the manufacturing equipment 900 can be set and then the manufacturing equipment 900 operates accordingly.

The frames FM shown on the user interface 910 of the manufacturing equipment 900 are transmitted to the remote control device 100. According to the frames FM, the remote control device 100 sends commands CM for controlling the cursor CS to click a particular control key on the user interface 910, such that the manufacturing equipment 900 can be automatically and remotely controlled without manpower.

Figure 2:
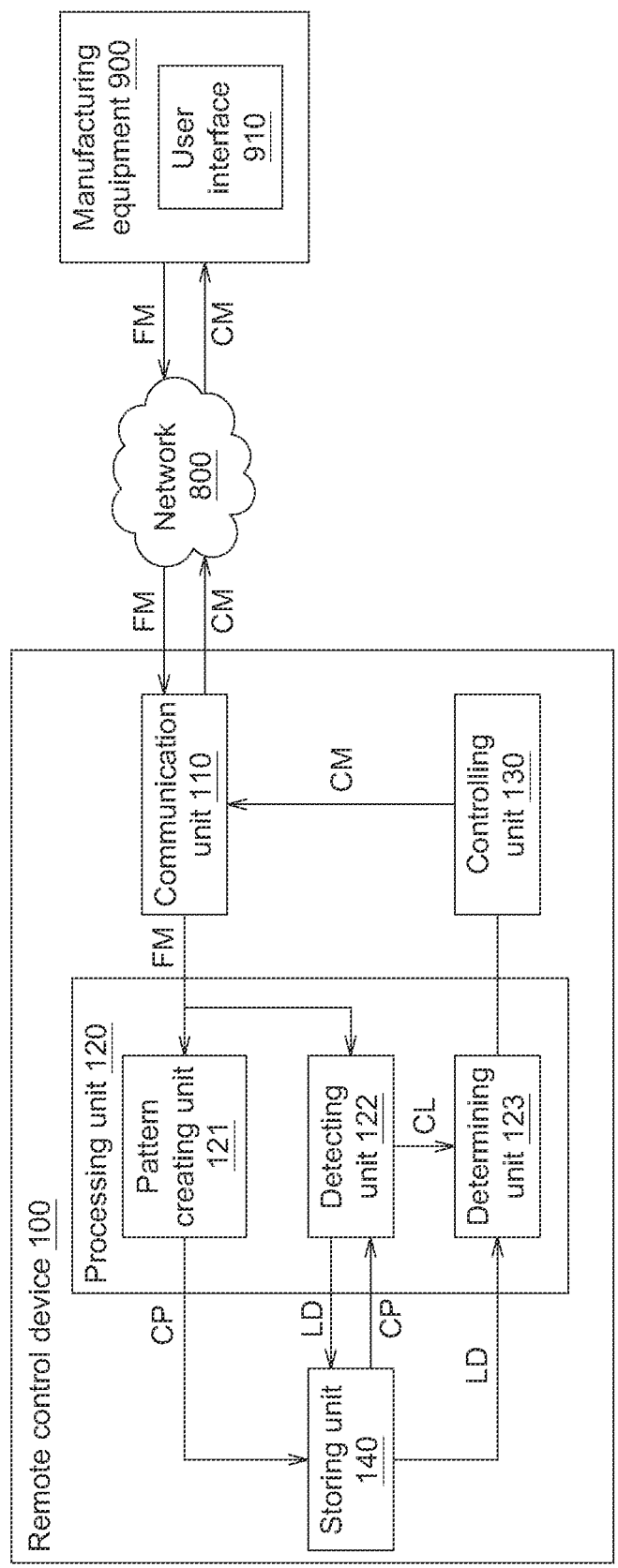
FIG. 2 shows a block diagram of the remote control device according to one embodiment.

Please referring to FIG. 2, a block diagram of the remote control device 100 according to one embodiment is shown. The remote control device 100 includes a communication unit 110, a processing unit 120, a controlling unit 130 and a storing unit 140. The components are briefly described as follows. The communication unit 110 is configured to communicate with the manufacturing equipment 900. For example, the communication unit 110 is a Wi-Fi communication module, a cable communication module or a LTE communication module. The processing unit 120 is configured to perform various analyzing procedures or calculating procedures. The processing unit 120 includes a pattern creating unit 121, a detecting unit 122 and a determining unit 123. For example, the processing unit 120, as well as the pattern creating unit 121, the detecting unit 122 and the determining unit 123 thereof, can be realized by a circuit, a chip, a circuit board or a storing device storing program codes. The controlling unit 130 is configured to control the manufacturing equipment 900. The controlling unit 130 can be realized by a circuit, a chip, a circuit board or a storing device storing program codes. The storing unit 140 is configured to store data. The storing unit 140 can be realized by a memory or a disk. The user interface 910 of the manufacturing equipment 900 is monitored by the processing unit 120 and controlled by the controlling unit 130, such that the manufacturing equipment 900 can be automatically and remotely controlled. Further, the user interface 910 of the manufacturing equipment 900 is detected by the processing unit 120, such that the manual control of the user interface 910 can be detected and the user interface 910 can be switched from an automatic control state to a manual control state. The operation of those components is illustrated via a flowchart as below.

Figure 3:
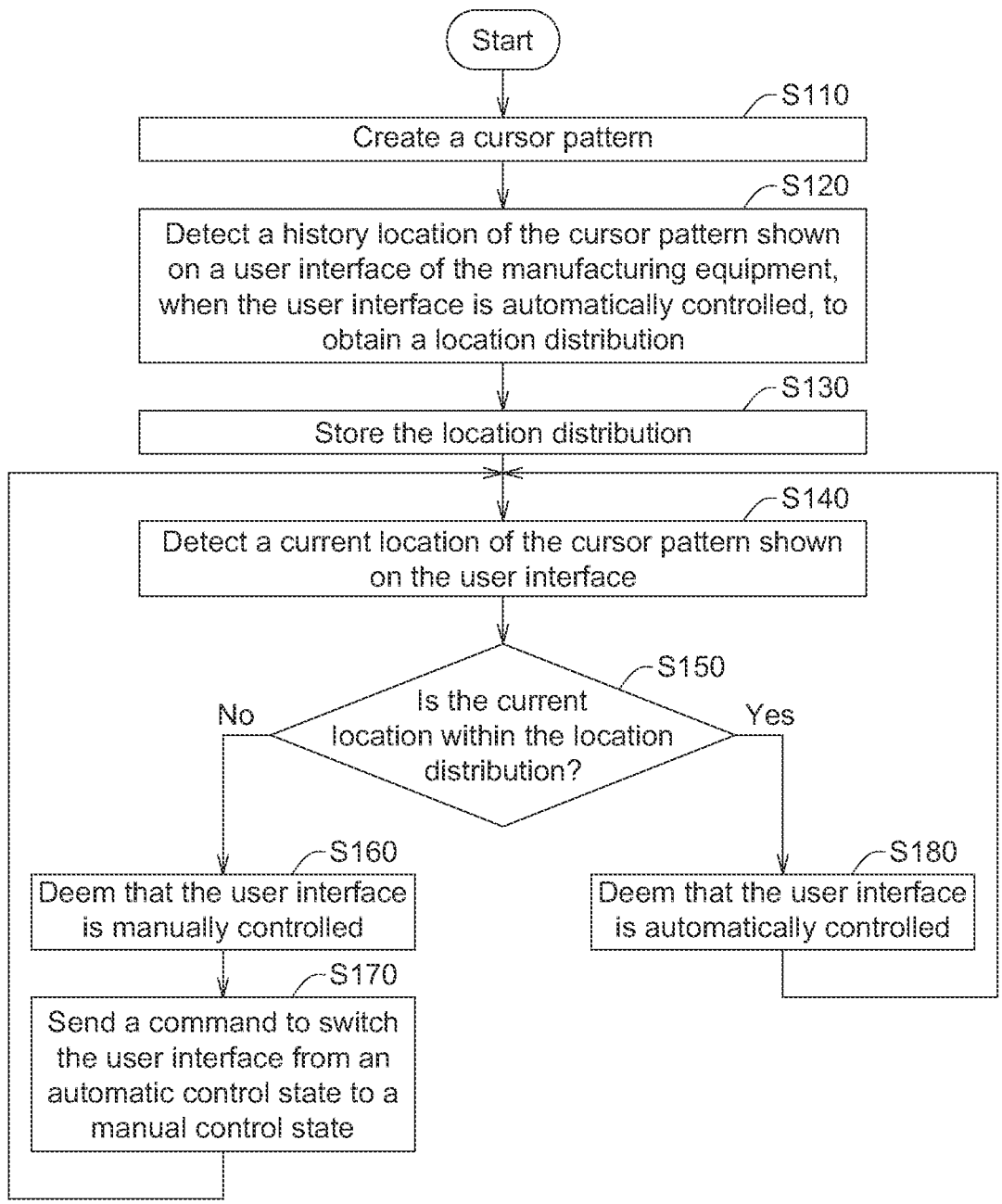
FIG. 3 is a flowchart of a method for detecting manual control on the manufacturing equipment according to one embodiment.
Figure 4:
FIG. 4 shows one example of the cursor pattern.

Please referring to FIG. 3, a flowchart of a method for detecting manual control on the manufacturing equipment 900 according to one embodiment is shown. In step S110, the pattern creating unit 121 creates the cursor pattern CP. Please refer to FIG. 4, which shows one example of the cursor pattern CP. The cursor pattern CP may be predefined or captured from the frames FM. When any key on the user interface 910 is clicked, the cursor pattern CP will show on the user interface 910 and point at this key. The cursor pattern CP is always the same while the user interface 910 is operated. The cursor pattern CP can be stored in the storing unit 140.

Next, in step S120, the detecting unit 122 detects a history location of the cursor pattern CP shown on the user interface 910 of the manufacturing equipment 900, when the user interface 910 is automatically controlled, to obtain a location distribution LD. In this step, the cursor pattern CP is detected via an object detection algorithm, such as a Convolution Neural Networks (CNN) algorithm or a Recurrent Neural Network (RNN) algorithm.

Figure 5:
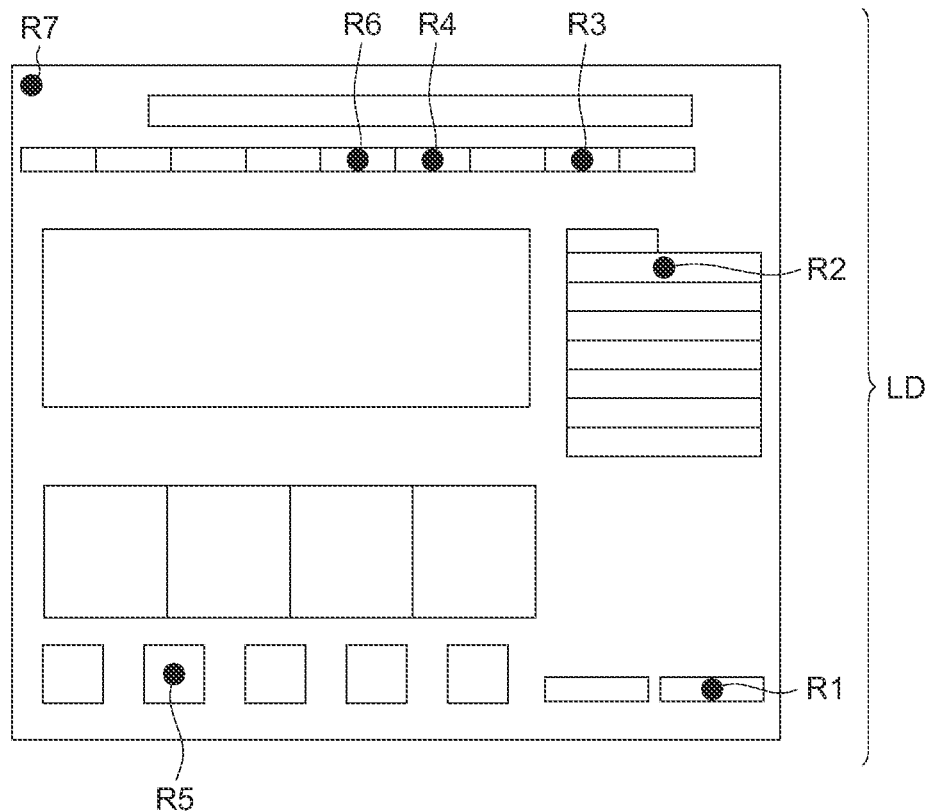
FIG. 5 shows an example of the location distribution.

Please refer to FIG. 5, an example of the location distribution LD is shown. The location distribution LD may include points or ranges separately located on the user interface 910. The location distribution LD shown in FIG. 5 includes ranges R1-R7.

Figure 6:
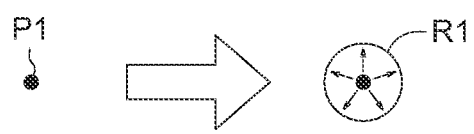
FIG. 6 illustrates one example that a point has been expended.

For increasing the detection success rate, the location distribution LD is expended by a predetermined range, such as 5 pixels, 10 pixels or 15 pixels. Please refer to FIG. 6, which illustrates one example that a point P1 has been expended. The point P1 is the actual location of the cursor pattern CP. For increasing the detection success rate, the point P1 is expanded by 5 pixels and becomes the range R1.

Then, in the step S130, the storing unit 140 stores the location distribution LD. In the present embodiment, the location distribution LD is stored at the remote control device 100 and is not stored at the manufacturing equipment 900.

Afterwards, in the step S140, the detecting unit 122 detects a current location CL of the cursor pattern CP shown on the user interface 910 according to the frames FM receiving from the communication unit 110. In this step, the detecting unit 122 periodically performs the detection.

Then, in the step S150, the determining unit 123 determines whether the current location CL is within the location distribution LD. If the current location CL is not within the location distribution LD, the process proceeds to the step S160; if the current location CL is within the location distribution LD, the process proceeds to the step S180.

Figure 7:
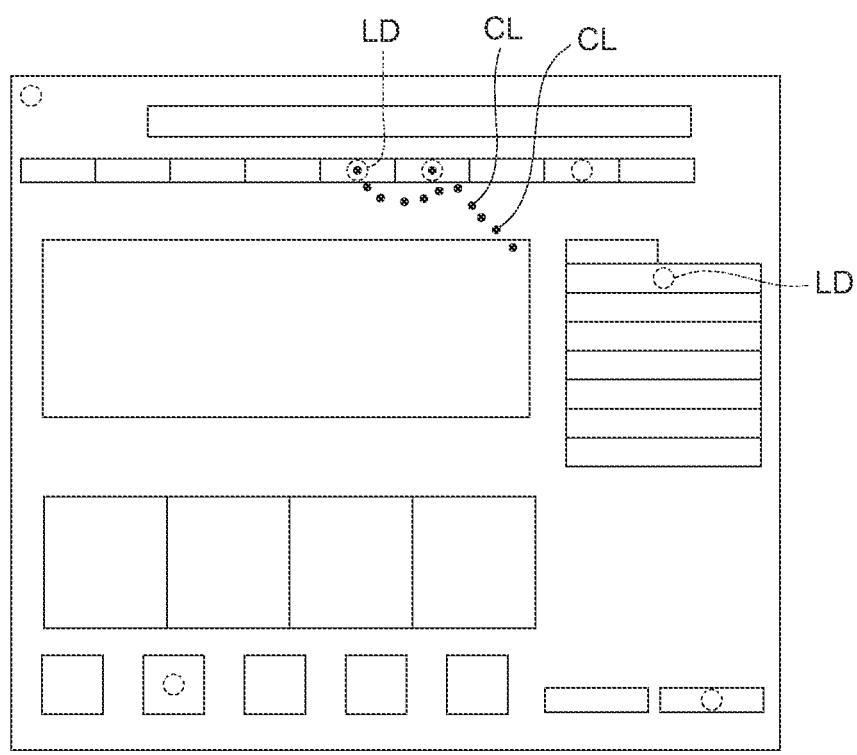
FIG. 7 shows an example of the current location.

In the step S160, the determining unit 123 deems that the user interface 910 is manually controlled. Please refer to FIG. 7, which shows an example of the current location CL. When the user interface 910 is manually controlled, the cursor pattern CP will move with the user's drag. Therefore, the current location CL of the cursor pattern CP may not be within the location distribution LD. Accordingly, the determining unit 123 can deem that the user interface 910 is manually controlled.

Next, in the step S170, the controlling unit 130 sends one command CM to switch the user interface 910 from the automatic control state to the manual control state. During the manual control state, the automatic control on the user interface 910 is disabled until the user interface 910 is switched to the automatic control state.

Figure 8:
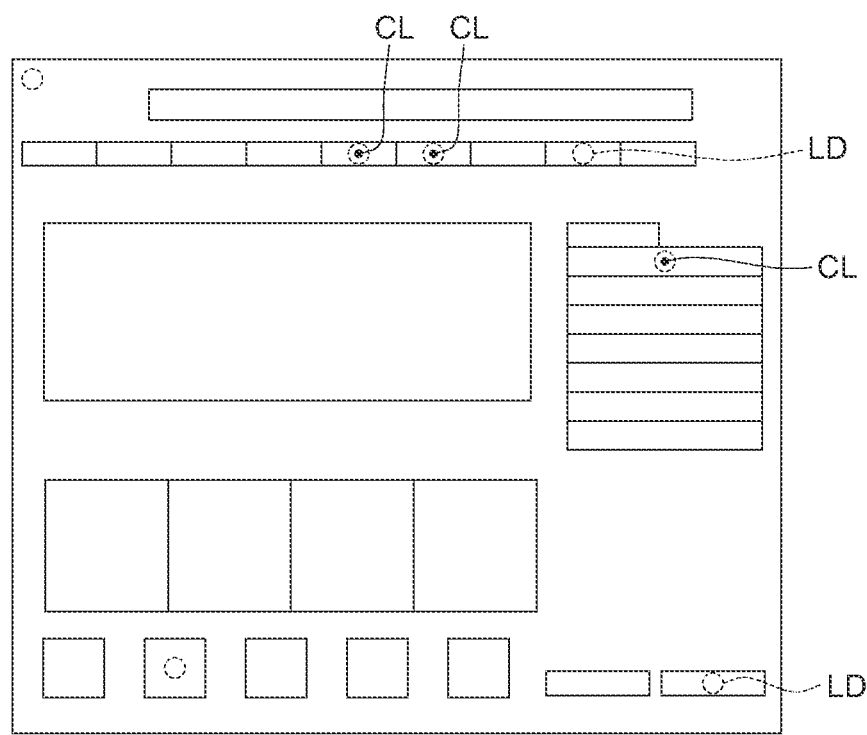
FIG. 8 shows another example of the current location.

At the step S180, the determining unit 123 deems that the user interface 910 is automatically controlled. Please refer to FIG. 8, which shows another example of the current location CL. When the user interface 910 is automatically controlled, the cursor pattern CP will appear according to the commands CM from the controlling unit 130. Therefore, the current location CL of the cursor pattern CP will be within the location distribution LD. Accordingly, the determining unit 123 can deem that the user interface 910 is automatically controlled.

According to the embodiments above, the user interface 910 of the manufacturing equipment 900 is detected by the processing unit 120, such that the manual control of the user interface 910 can be detected and the user interface 910 can be switched from the automatic control state to the manual control state. During the manual control state, the automatic control on the user interface 910 is disabled until the user interface 910 is switched to the automatic control state. Therefore, the conflict between the automatic control and the manual control can be prevented.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for detecting manual control on a manufacturing equipment, comprising:
   creating a cursor pattern;
   detecting a history location of the cursor pattern shown on a user interface of the manufacturing equipment, when the user interface is automatically controlled, to obtain a location distribution;
   storing the location distribution;
   detecting a current location of the cursor pattern shown on the user interface; and
   deeming that the user interface is manually controlled if the current location is not within the location distribution;
   wherein the location distribution is expended by a predetermined range.

2. The method according to claim 1, wherein the predetermined range is 5 pixels.

3. The method according to claim 1, wherein the history location includes points separately located on the user interface.

4. The method according to claim 1, further comprising:
sending a command to switch the user interface from an automatic control state to a manual control state, if the user interface is manually controlled.

5. The method according to claim 1, wherein that the user interface is automatically controlled is deemed if the current location is within the location distribution.

6. The method according to claim 1, wherein the step of detecting the current location of the cursor pattern shown on the user interface is performed periodically.

7. The method according to claim 1, wherein in the step of detecting the history location of the cursor pattern shown on the user interface of the manufacturing equipment, the cursor pattern is detected via an object detection algorithm.

8. The method according to claim 7, wherein the object detection algorithm is Convolution Neural Networks (CNN) algorithm or Recurrent Neural Network (RNN) algorithm.

9. The method according to claim 1, wherein frames of the user interface are transmitted to a remote control device which is remotely connected to the manufacturing equipment.

10. A remote control device for a manufacturing equipment, comprising:
a communication unit configured to receive frames of a user interface of the manufacturing equipment; and
a processing unit, including:
a pattern creating unit configured to create a cursor pattern;
a detecting unit configured to detect a history location of the cursor pattern shown on a user interface of the manufacturing equipment, when the user interface is automatically controlled, to obtain a location distribution;
a determining unit, wherein the detecting unit is further configured to detect a current location of the cursor pattern shown on the user interface, and the determining unit is further configured to deem that the user interface is manually controlled if the current location is not within the location distribution; and
an expanding unit for expending the location distribution by a predetermined range; and
a storing unit configured to store the location distribution.

11. The remote control device according to claim 10, wherein the predetermined range is 5 pixels.

12. The remote control device according to claim 10, wherein the history location includes points separately located on the user interface.

13. The remote control device according to claim 10, further comprising:
a controlling unit configured to send a command to switch the user interface from an automatic control state to a manual control state, if the user interface is manually controlled.

14. The remote control device according to claim 10, wherein the determining unit deems that the user interface is automatically controlled if the current location is within the location distribution.

15. The remote control device according to claim 10, wherein the detecting unit periodically detects the current location.

16. The remote control device according to claim 10, wherein the detecting unit detects the cursor pattern via an object detection algorithm.

17. The remote control device according to claim 16, wherein the object detection algorithm is Convolution Neural Networks (CNN) algorithm or Recurrent Neural Network (RNN) algorithm.

18. The remote control device according to claim 10, wherein the remote control device is remotely connected to the manufacturing equipment.

* * * * *